United States Patent
Kemnitz

(10) Patent No.: US 10,160,318 B2
(45) Date of Patent: *Dec. 25, 2018

(54) VEHICLE CRUISE CONTROL WITH MULTIPLE SET POINTS

(71) Applicant: Ford Global Technologies, LLC, Dearborn, MI (US)

(72) Inventor: Erich Kemnitz, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/887,537

(22) Filed: Feb. 2, 2018

(65) Prior Publication Data

US 2018/0170179 A1 Jun. 21, 2018

Related U.S. Application Data

(63) Continuation of application No. 14/989,443, filed on Jan. 6, 2016, now Pat. No. 9,884,554.

(51) Int. Cl.
*B60K 31/04* (2006.01)
*B60K 31/18* (2006.01)
*B60W 30/14* (2006.01)
*B60W 50/08* (2012.01)

(52) U.S. Cl.
CPC .......... *B60K 31/045* (2013.01); *B60K 31/185* (2013.01); *B60W 30/143* (2013.01); *B60W 30/146* (2013.01); *B60W 50/085* (2013.01); *B60W 2520/10* (2013.01); *B60W 2540/28* (2013.01); *B60W 2550/22* (2013.01); *B60W 2550/402* (2013.01); *B60W 2720/10* (2013.01)

(58) Field of Classification Search
CPC . B60K 31/045; B60K 31/185; B60W 30/146; B60W 2550/402; B60W 2520/10; B60W 2540/28; B60W 2720/10
See application file for complete search history.

(56) References Cited

U.S. PATENT DOCUMENTS

| 5,393,277 A | 2/1995 | White |
| 5,775,451 A | 7/1998 | Hull et al. |
| 6,125,320 A | 9/2000 | Hellman |
| 6,324,463 B1 | 11/2001 | Patel |

(Continued)

FOREIGN PATENT DOCUMENTS

| CN | 101786420 A | 7/2010 |
| CN | 102963255 A | 3/2013 |

(Continued)

OTHER PUBLICATIONS

Search Report dated Jun. 20, 2017 for Great Britain Patent Application No. GB1700239.5 (5 Pages).

(Continued)

*Primary Examiner* — Russell Frejd
(74) *Attorney, Agent, or Firm* — James P. Muraff; Neal, Gerber & Eisenberg LLP

(57) ABSTRACT

In various embodiments, the present disclosure includes a cruise control system with (a) a vehicle having a steering system, an accelerator system, a braking system, a battery, a display, a processor, and memory; and (b) a cruise control program, operatively coupled to the accelerator system and configured to display a most recent cruising setpoint and a menu of user-adjustable cruising setpoints.

20 Claims, 6 Drawing Sheets

(56) References Cited

U.S. PATENT DOCUMENTS

| | | |
|---|---|---|
| 7,234,556 B2 | 6/2007 | Pendleton |
| 2004/0084237 A1 | 5/2004 | Petrie, Jr. |
| 2005/0257976 A1 | 11/2005 | Moczydlowski |
| 2007/0156321 A1 | 7/2007 | Schad |
| 2010/0217494 A1 | 8/2010 | Heft |
| 2010/0318273 A1 | 12/2010 | Aleksic |
| 2012/0179351 A1 | 7/2012 | Mallet |
| 2013/0253797 A1 | 9/2013 | McNew |
| 2014/0316670 A1 | 10/2014 | Krauss |
| 2015/0217768 A1 | 8/2015 | Fairgrieve |
| 2015/0232093 A1 | 8/2015 | Fairgrieve |

FOREIGN PATENT DOCUMENTS

| | | |
|---|---|---|
| DE | 10065897 A1 | 5/2002 |
| DE | 102008037020 A1 | 2/2010 |
| EP | 0978407 A2 | 2/2000 |
| JP | 2004142689 A | 5/2004 |
| WO | WO 2008/082403 A1 | 7/2008 |

OTHER PUBLICATIONS

Why settle for just driving when you can cruise?, Rostra Precision Controls, Inc.,http://www.rostra.com/custom-cruise-control-systems-with-vehicle-speed-limiter.php.

Auscruise by Charge Plus Cruise Control: Operating Instructions, Charge Plus, http://www.chargeplus.com.au/PDF/Auscruise%20Operating%20Instructions%20Book.pdf.

VEHICLE CRUISE CONTROL WITH MULTIPLE SET POINTS

CROSS-REFERENCE TO RELATED APPLICATIONS

This application is a continuation of U.S. application Ser. No. 14/989,443 filed on Jan. 6, 2016, issuing as U.S. Pat. No. 9,884,554 on Feb. 6, 2018, which is incorporated by reference in its entirety.

TECHNICAL FIELD

The present disclosure generally relates to a system and method for storing multiple cruise control setpoints for a vehicle.

BACKGROUND

Vehicles typically include a cruise control function that enables a driver to select a cruise control or cruising speed. The cruise control automatically adjusts at least one of the vehicle's braking and acceleration to maintain the selected speed.

With reference to FIG. 7, existing cruise control systems include a cruise control program responsive to an ON switch 701, a set speed button 702, a speed increase button 703, a speed decrease button 704, and a resume button 705. The ON switch 701 enables the set speed button 702. The set speed button 702 causes the vehicle to adopt a current or present speed as the cruising speed. The speed increase 703 and decrease 704 buttons cause the vehicle to increase or decrease the cruising speed. The resume button 705 causes the vehicle to restore the most recent cruising speed. The driver typically disengages cruise control by pressing on the vehicle's brake pedal.

Typical cruise control programs fail to: (1) display the current cruise control speed, (2) enable a driver to pick from multiple cruise control setpoints, and (3) enable the driver to pick or view cruise control setpoints when the cruise control is OFF (i.e., when the user is prevented from adopting a cruising speed).

SUMMARY

In various embodiments, the present disclosure includes a cruise control system comprising: a vehicle having a steering system, an accelerator system, a braking system, a battery, a display, a processor, and memory; a cruise control program, operatively coupled to the accelerator system and configured to display a most recent cruising setpoint and a menu of user-adjustable cruising setpoints.

In various embodiments, the present disclosure includes a method of setting a cruise control speed on a vehicle having a steering system, an accelerator system, a braking system, a battery, a display, a processor, and memory, the method comprising: displaying, on a cruise control program operatively coupled to the accelerator system: a most recent cruising setpoint and a menu of user-adjustable cruising setpoints.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
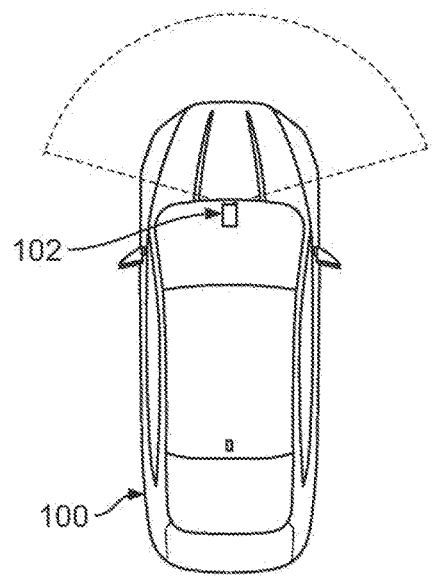
FIG. 1 is a top perspective view of a vehicle of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

FIG. 1 shows a vehicle 100 in accordance with one embodiment. The vehicle 100 may be a standard gasoline powered vehicle, a hybrid vehicle, an electric vehicle, a fuel cell vehicle, or any other type of suitable vehicle. The vehicle 100 includes standard features (not shown) such as a dashboard, adjustable seats, one or more batteries, an engine or motor, a transmission, an HVAC system including a compressor and electronic expansion valve, a windshield, doors, windows, seatbelts, airbags, and tires.

Vehicle 100 may include sensors 102. The sensors 102 can be arranged in and around the car in a suitable fashion. The sensors can all be the same or different. There can be many sensors or only a single sensor. The sensors may include a camera, sonar, LiDAR, radar, an optical sensor, or an infrared device configured to measure properties around the exterior of the vehicle, as indicated by the dashed line in FIG. 1a. Some sensors 102 may be mounted inside the passenger compartment of the vehicle 100 or in the engine compartment of the vehicle 100. At least one sensor 102 may be used to identify the vehicle's driver via facial recognition, speech recognition, or communication with a device, such as a vehicle key or mobile phone personal to the driver. The sensors may have an OFF state and various ON states. The vehicle 100, or a device operatively connected to the vehicle, may be configured to control the states or activity of the sensors. It should be appreciated that the term "internal sensors" includes all sensors mounted to the vehicle, including sensors that are mounted to an exterior of the vehicle.

Figure 2:
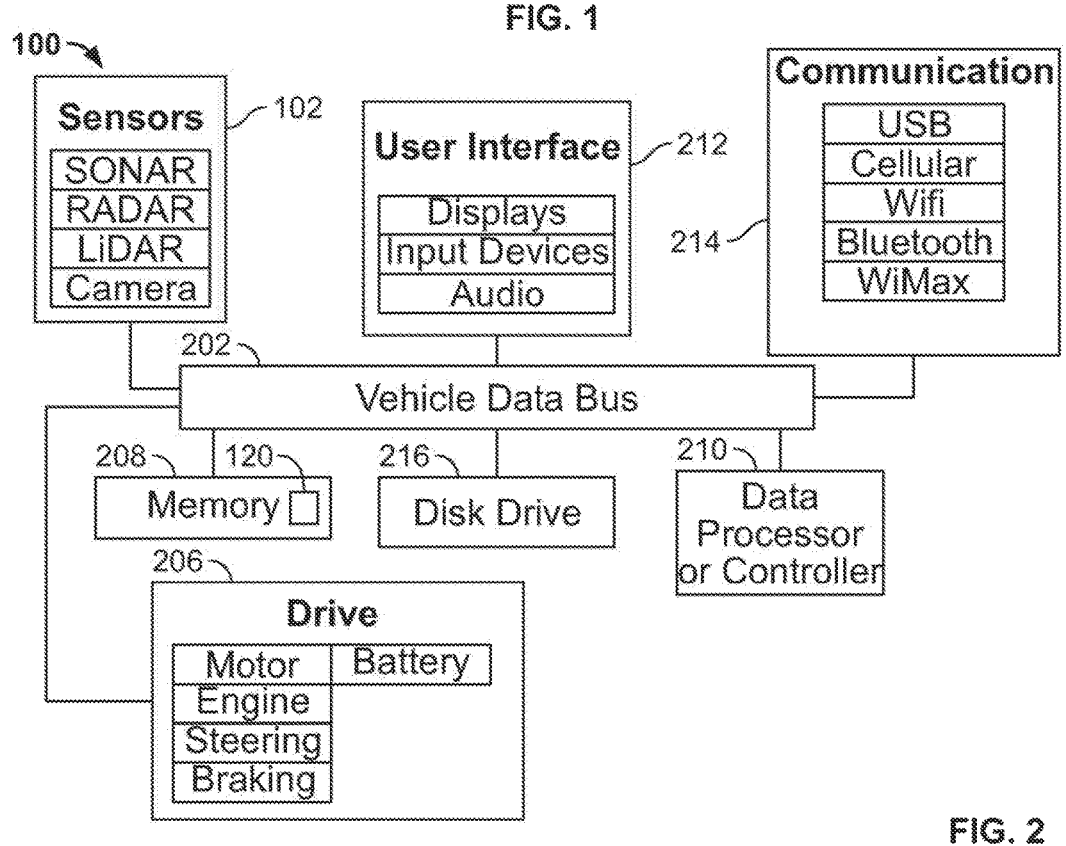
FIG. 2 is a block diagram illustrating electronic components of the vehicle of FIG. 1.

As shown in FIG. 2, in one embodiment, vehicle 100 includes a vehicle data bus 202 operatively coupled to the sensors 102, vehicle drive devices 206, memory or data storage 208, a processor or controller 210, the user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of the vehicle to input modifications or updates to information referenced by the cruise control program 120 as described herein. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers.

The disk drive 216 is configured to receive a computer readable medium. In certain embodiments, the disk drive 216 receives the computer-readable medium on which one or more sets of instructions, such as the software for operating the methods of the present disclosure including the cruise control program 120 can be embedded. The instructions may embody one or more of the methods or logic as described herein. In a particular embodiment, the instructions of the cruise control program 120 may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a computer to perform any one or more of the methods or operations disclosed herein.

FIG. 2 shows the cruise control program or software 120 loaded in memory 208. It should be appreciated that upon execution, the cruise control program 120 may operatively interact with all of the features and components illustrated in FIG. 2. In particular, the cruise control program 120 may be connected to the vehicle drive 206 to control vehicle acceleration via the motor or engine and deceleration via the motor, engine, and brakes. When the cruise control program 120 receives a setpoint, it sends a signal to the drive 206 causing the vehicle to maintain the setpoint. In one embodiment, the cruise control program 120 is configured to control the vehicle's acceleration and deceleration via the engine or motor, but cannot control or apply the brakes of the vehicle 100. This enables the user to accelerate above the cruise control setpoint. In one embodiment, when the user applies brakes, the cruise control program 120 automatically pauses or deactivates, enabling the user to slow down.

FIGS. 3, 4, 5, and 6 illustrate exemplary graphical user interfaces 300, 400, 500 for the cruise control program or software 120 of the present disclosure. The graphical user interfaces may be displayed on the user interface 212, such as on a touch screen. Alternatively, the interfaces may be displayed on the user interface 212 on a non-touch electronic display, and the vehicle 100 may enable the user to interact with the interfaces via a suitable input device. Additionally, buttons corresponding to features of the graphical user interfaces may be manufactured as a separate input device or button in the vehicle. For example, the vehicle 100 may include a physical button corresponding to resume selector 308.

The user interfaces may include a base interface 300, a history interface 400, and a trend interface 500. It should be appreciated that the interfaces 300, 400, and 500 may be displayed separately or simultaneously. The cruise control program 120 and the interfaces 300, 400, and 500 may include transfer features that enable the user to toggle from one interface to another. The cruise control program 120 and the interfaces 300, 400, and 500 may include ordering features that enable the user to rearrange the presentation or ordering of the interfaces 300, 400, and 500.

To arrive at or generate the interfaces 300, 400, and 500, the user starts the vehicle 100, and specifically causes the vehicle 100 to supply power to some or all the electronic components operatively connected to the vehicle data bus 202 as in FIG. 2. The user need not start the engine or motor. The interfaces 300, 400, and 500 may have various options or features that depend on the vehicle's current gear or driving status. For example, the base interface 300 may only enable the user to apply a cruise control setpoint when the vehicle is in drive. Additionally, the base interface 300 may only enable the user to change or adjust a cruise control setpoint when the vehicle is in park.

In the present embodiment, the user may apply or engage any feature of the interfaces 300, 400, and 500 when the vehicle is in park, except the user cannot apply a cruise control setpoint unless the vehicle is in drive. When the vehicle is in drive, the user may apply any cruise control setpoint within a predetermined range or range percentage of the vehicle's current speed. The predetermined range can be user-adjustable or hard-coded into the cruise control program 120. For example, the manufacturer may hard-code into the cruise control program 120 that the user may only apply a cruise control speed within 8 mph of the vehicle's current speed to prevent the vehicle and the user from experiencing extreme acceleration and/or deceleration.

The base interface 300 enables the user to select from a list or menu of cruise control setpoints. The base interface includes application transfer selectors 301, 302, and 303; identity and field selectors 305 and 306; a scrollable setpoint menu 310 with cruise control setpoints 311 having labels 312; a last selector 307, a resume selector 308, a hide or transfer selector 309; and an activate selector 320.

The application transfer selectors 301, 302, and 303, when touched or engaged, cause the user interface 212 to pull up or display a specific graphical user interface. The vehicle 100, for example, may include a GPS system configured to generate an electronic map. The user may touch or engage GPS transfer selector 301 to pull up the electronic map associated with the GPS system. Similarly, the cruise control graphical user interfaces 300, 400, and 500 may be associated with one or more particular transfer selectors, such as a cruise control transfer selector 303. The user may touch or engage the cruise control transfer selector 303 causing the user interface 212 to display one or more of the interfaces 300, 400, and 500. It should be appreciated that when touched or activated, the cruise control transfer selector 303 may automatically display all of the interfaces 300, 400, and 500, may automatically display the most recently used of the interfaces 300, 400, and 500, or may open a menu enabling the user to choose one or more of the interfaces 300, 400, and 500 for display.

Figure 3:
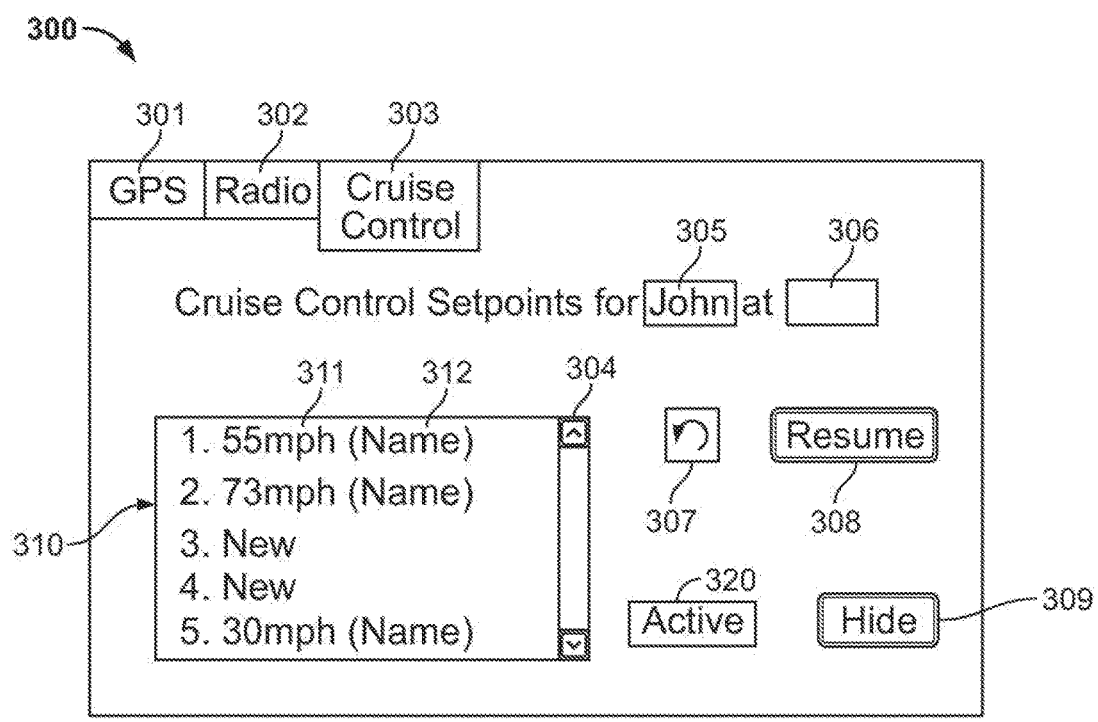
FIGS. 3, 4, and 5 show virtual interfaces generated by a cruise control program of the vehicle of FIG. 1.

The scrollable setpoint menu 310 is configured enable the user to view and select, touch, or engage multiple cruise control setpoints 311. Each cruise control setpoint 311 may have an associated user-adjustable label 312. FIG. 3 shows five possible cruise control setpoints 311, but the base interface 300 may be capable of displaying any suitable number of cruise control setpoints. More specifically, the user may scroll through a plurality of setpoints 311 by scrolling up or down with a bar 304. A quantity selector (not shown) may enable the user to choose how many setpoints 311 are simultaneously displayed on the base interface 300.

The activate selector 320 enables the user to toggle cruise control implementation on and off. When the activate selector 320 is in the OFF position, the user is unable to apply a cruise control setpoint (i.e., cause the vehicle to actually run at the cruise control setpoint), although the user may still engage other functions of the cruise control program 120. In some embodiments, the activate selector 320 must be toggled ON for the user to apply or implement a cruise control setpoint.

The identity selector 305 is configured to limit or match the setpoints displayed in setpoint menu 310 to a particular identity. The identity selector 305 may display the name or identity of the user. The user may touch or engage the identity selector 305 to choose a different user. It should be appreciated that the identity selector 305 may be automatically populated via any suitable identity sensor 102 associated with the vehicle 100. For example, using facial recognition software or car key recognition software along with sensors 102, the identity selector may recognize that John is driving the vehicle 100, as shown in FIG. 3.

The field selector 306 is also configured to limit the setpoints displayed in setpoint menu 310. The field selector 306 may enable the user to choose one or more of a time of day, a day of the week, a place such as an approximate area or a county, and a weather condition such as rain or snow.

In combination, the identity selector 305 and the field selector 306 enable the user to store choose from a plurality of stored setpoint menus 310, then display or pull up one of the stored menus based on the user's identity, the time of day, and the location. For example, John may have a first setpoint menu 310 for morning rush hour in downtown Chicago, Ill. and a second setpoint menu for night highway travel between Chicago and Madison, Wis. The base interface 300 may be configured to switch between the user's setpoint menus 310 when the vehicle senses or receives an external condition relevant to field selector 306. For example, the vehicle may automatically fill in or apply an appropriate field selector based on a sensed, measured, or calculated time of day, the day of week, location, or weather event. It should be appreciated that the user may deactivate the field sensor 306, causing the menu to show all setpoint options affiliated with a particular user.

The last selector 307 is configured to automatically apply the previous cruise control setpoint. For example, if the user applied a 50 mph cruise control setpoint, then switched to a 55 mph cruise control setpoint, the last button, if touched or engaged, would switch the vehicle's cruise control back to the previous 50 mph setpoint. The resume selector 308 is configured to automatically resume the most recent cruise control setpoint. This is advantageous, for example, if the user applies a 65 mph setpoint, deactivates cruise control, then wishes to re-active the 65 mph setpoint. The hide selector 309 is configured to minimize or hide the interface 300. When pressed, a corresponding expand selector (not shown) may appear on the display, enabling the user to maximize or expand interface 300.

Figure 4:
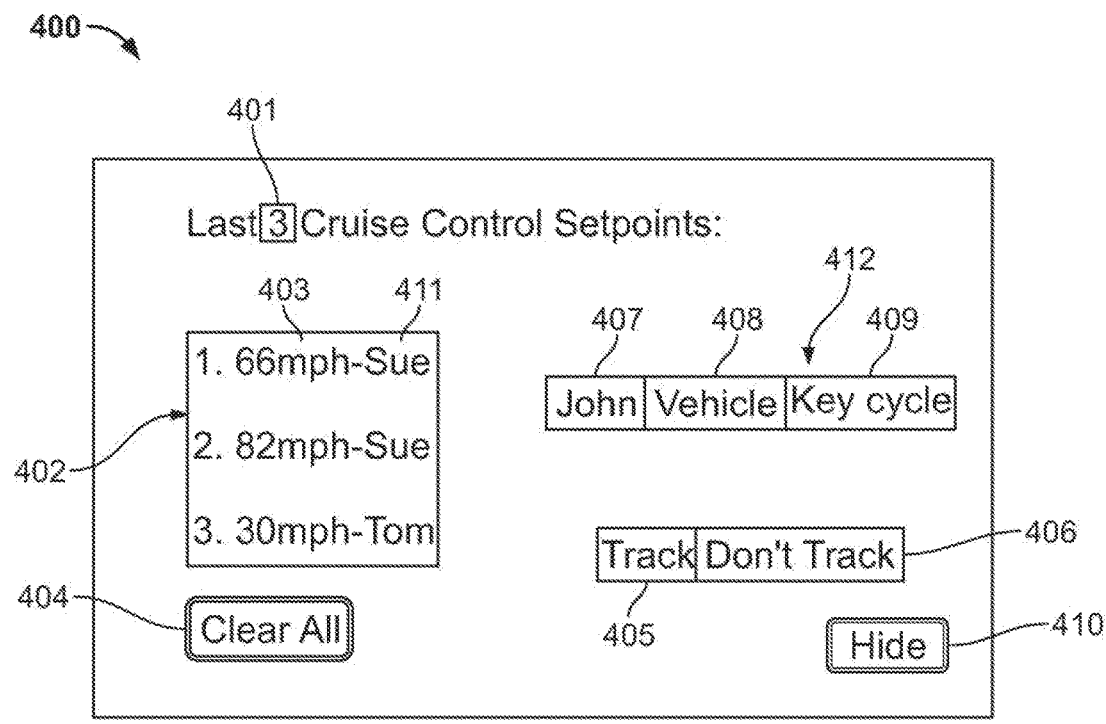

Turning now to FIG. 4, the history interface 400 is configured to display previously applied setpoints. The user may apply a setpoint by touching or engaging one of the displayed historical setpoints. More specifically, the history interface 400 includes a quantity selector 401, a scrollable setpoint history menu 402 with setpoints 403 having labels 411, one or more history selectors 412, a tracking selectors 405 and 406, a clear all selector 404, and a hide selector 410.

The quantity selector 401 is configured to control the number or quantity of setpoints 403 displayed in setpoint history menu 402. The cruise control program 120 automatically populates history menu 402 with a relevant history or record of cruise control setpoints. The setpoints 403 may include an associated label 411 identifying the user who applied the setpoint 403. The tracking selectors 405 and 406 enable the user to deactivate the cruise control's recording feature, such that new or future cruise control setpoints will not appear in history menu 402. The user may clear the history by pressing clear all selector 404.

The history selectors 412 are configured to control or limit the kind of information displayed in the history menu 402. More specifically, the user may touch or engage one of an identity selector 407, a vehicle selector 408, and a key cycle selector 409. Touching or engaging the identity selector 407 causes the history menu 402 to populate with a setpoint history of a specific user, such as John. Touching or engaging the vehicle selector 408 causes the history menu 402 to populate with a setpoint history of the vehicle 100, including other vehicle users or drivers such as Sue and Tom. Touching or engaging the key cycle selector 409 causes the history menu 402 to populate with a setpoint history related to only the current key cycle. For the purposes of the specification and the claims, a key cycle is defined to mean a span of time beginning when a vehicle is turned to an ON state from an OFF state and ending when the vehicle is turned to the OFF state from the ON state.

The hide selector 410 functions similar to the hide selector 309. The hide selector 410 is configured to minimize or hide the history interface 400. When pressed, a corresponding expand selector (not shown) may appear on the display, enabling the user to maximize or expand the history interface 400.

Figure 5:
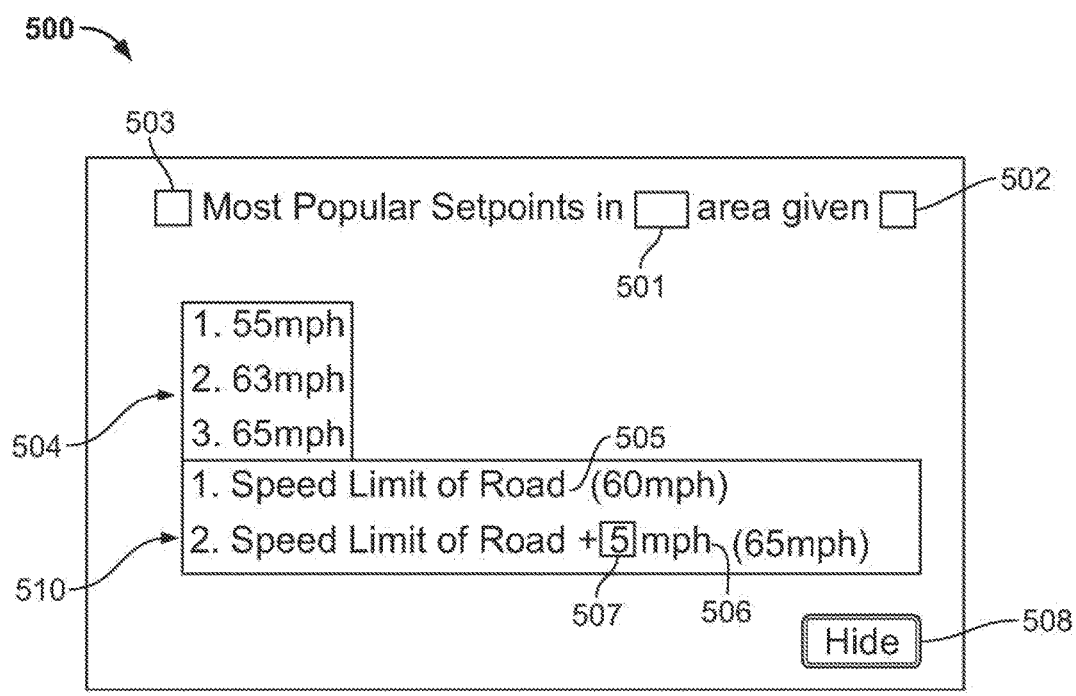

Turning now to FIG. 5, the trend interface 500 is configured to display trending or notable cruise control setpoints. More specifically, the trend interface 500 includes a scrollable trending setpoint menu 509, a notable scrollable setpoint menu 510, a quantity selector 503, a region selector 501, and an attribute selector 502.

The scrollable trending setpoint menu 509 may include a list or menu of popular cruise control setpoints 503. The setpoints 503 may be ranked in order of their popularity. The setpoints may be associated with setpoint labels (not shown).

Figure 6:
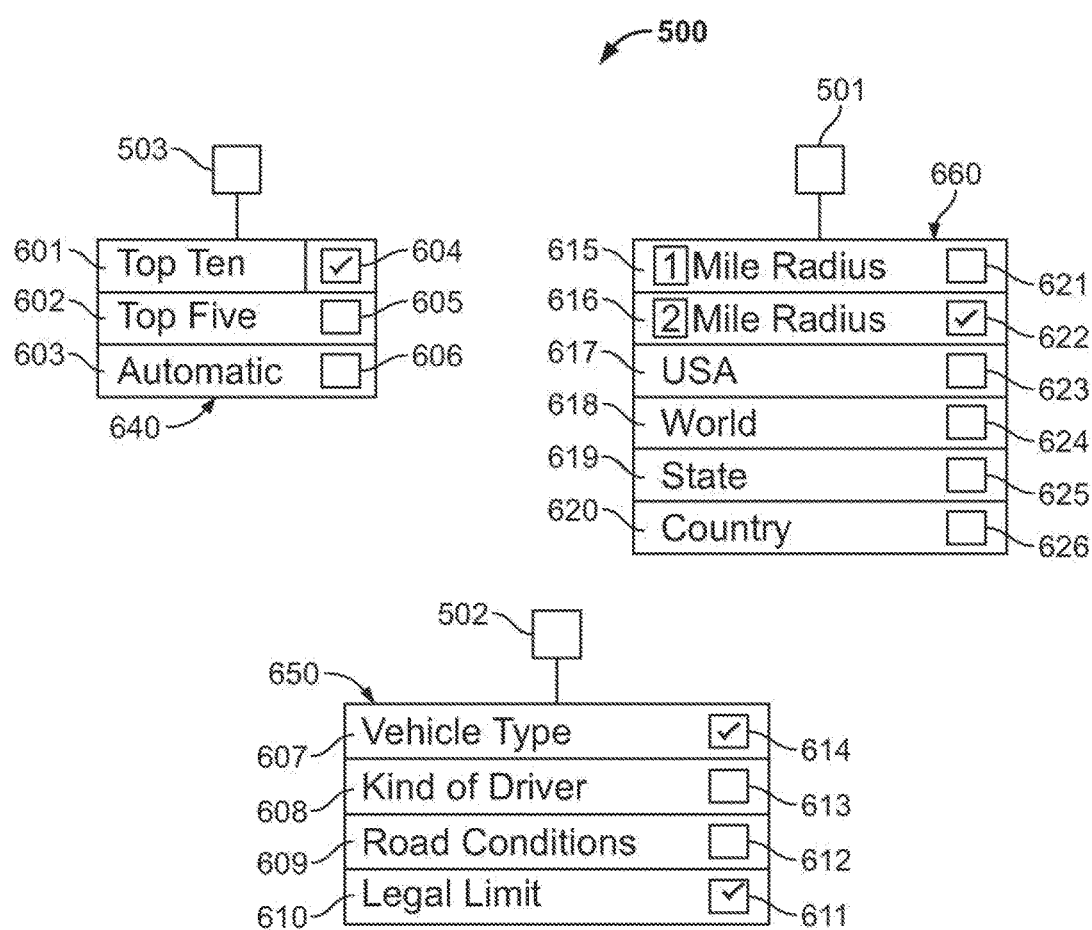
FIG. 6 shows virtual sub-menus affiliated with the interface of FIG. 5.
Figure 7:
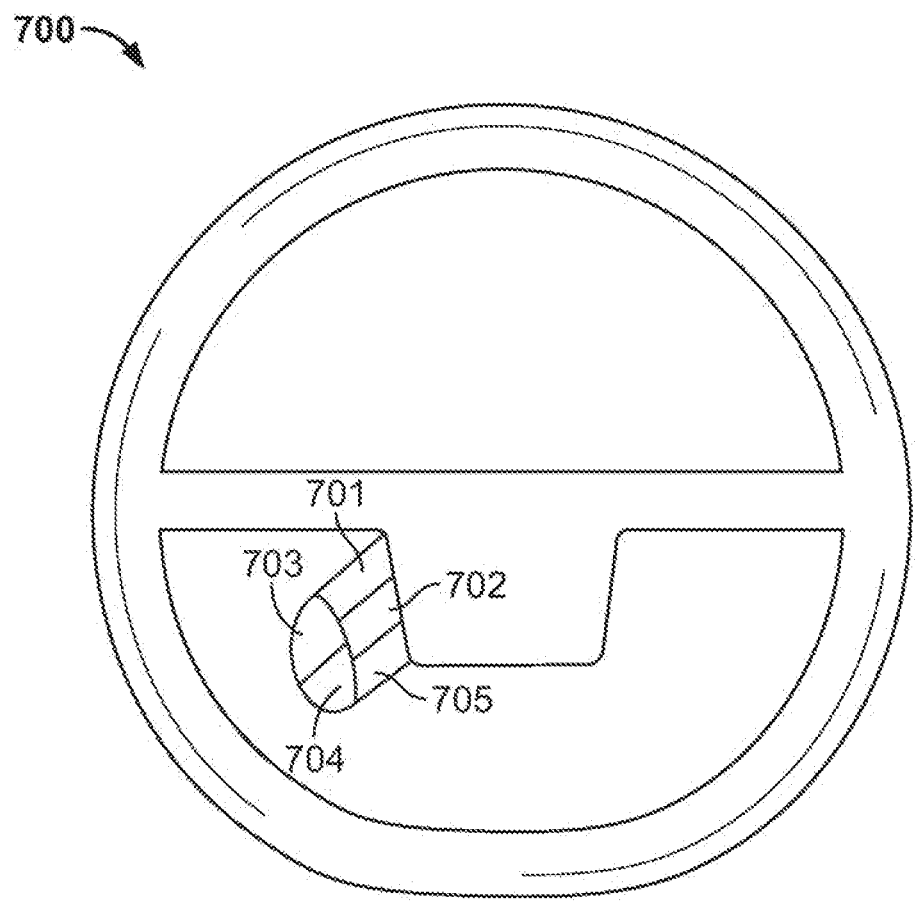
FIG. 7 shows a prior art cruise control system.

The quantity selector 509, the region selector 501, and the attribute selector 502 are configured to control or determine the setpoints displayed in the scrollable trending setpoint menu 509. FIG. 6 illustrates the user engaging the quantity selector 509, the region selector 501, and the attribute selector 502. The user may touch or engage the quantity selector 509 to adjust the number or quantity of setpoints displayed in menu 509. More specifically, the user may touch or engage the quantity selector 509, causing a quantity sub-menu 640 to appear and expand. The quantity sub-menu 640 may contain pre-populated quantity options, such as a top ten 601 or top five 602 most popular setpoints. The quantity sub-menu 640 may also enable the user to select an arbitrary number or quantity of most popular setpoints. The quantity sub-menu 640 may include an automatic option 603 that causes the cruise control program 120 to automatically choose an appropriate number or quantity of popular setpoints. The cruise control program 120 may be configured to indicate a selection with a visual indication such as a change in color (not shown) or a check mark 504, 505, and 506.

The user may touch or engage the region selector 501 to limit popular setpoints to a specific area or region. More specifically, the user may touch or engage the region selector 601, causing a region sub-menu 660 to appear and expand. Options 615 and 616 enable the user to limit popular setpoints to the user-adjustable radius around the current location of the vehicle 100. Options 617 to 620 include various pre-defined geographical areas. The cruise control program 120 may be configured to indicate a selection, application, or implementation with a visual indication such as a change in color (not shown) or a check mark 621 to 626.

The attribute selector 502 further limits popular setpoints with attribute options 607 to 610. The attribute option 607 limits popular setpoints to similar vehicles, the attribute option 608 limits popular setpoints to vehicles with similar kinds (e.g., aggressive, passive) of drivers, the attribute option 609 limits popular setpoints to vehicles experiencing similar road conditions (e.g., raining, snowing), and the attribute option 610 limits popular setpoints to vehicles within the legal speed limit, and specifically within the present legal speed limit of the vehicle 100. Another attribute option (not shown) limits popular setpoints to those under a predetermined speed limit. The predetermined speed limit can be hard-coded by the manufacturer or can be transmitted to the vehicle. In some embodiments, this attribute option is hard coded to be unalterably selected and applied. The cruise control program 120 may be configured to indicate a selection with a visual indication such as a change in color (not shown) or a check mark 611 to 614.

Returning now to FIG. 5, the notable scrollable setpoint menu 510 displays notable cruise control setpoints 505 and 506 in the area. One such notable setpoint may be the current speed limit of the road 505. Another notable setpoint 506 may be the current speed limit of the road plus the user adjustable speed bonus 507. The cruise control program 120 may update these notable speed limits on-demand as driving conditions change (e.g., the vehicle moves from a jurisdiction with one speed limit to a jurisdiction with a different speed limit). The cruise control program 120 may display additional notable speed limits on-demand as driving conditions change (e.g., weather turns to snow, causing the cruise control program 120 to display a suggested snow driving speed).

Many of the above features require information from an external source, such as a database of jurisdictional speed limits. The vehicle may be configured to dynamically update the features by frequently querying the external source or database via the communication devices 214. The cruise control program 120 may buffer or preemptively store information relevant to a particular feature. For example, the cruise control program 120 may buffer or preemptively store speed limit information for adjacent jurisdictions.

It should be appreciated that when a feature requires extra display area, the cruise control program 120 may expand the area allocated to the feature or may activate scrolling, such that user may scroll or browse through the feature without the feature taking up additional display area.

Features may be automatically populated. It should be appreciated that an automatic change or population may be visually indicated by a cue, such as a temporary change in color. The user may manually override automatic implementations or adjustments. The cruise control program 120 may include options to deactivate automatic populations or automatic implementations. The cruise control program 120 may generate a cue when the user attempts to touch or engage an unavailable option, selector, or menu. For example, if the user attempts to touch or engage a speed limit outside of the permissible range, the program may light up the attempted selection in red.

It should be appreciated that the sub-menus of FIG. 6 may also apply to the interfaces 300 and 400. It should be appreciated that sub-menus may appear in response to a special touch or engagement. For example, the user may apply a setpoint 311 from menu 310 by left clicking or briefly touching the area of the display associated with the setpoint 311. The user may adjust a setpoint 311 via a sub-menu by right licking or touching and holding the area of the display associated with the setpoint 311. Although the sub-menus are shown as having a list of options with check marks as in FIG. 6, some sub-menus may include an area for typing. In particular, when the user opens a sub-menu corresponding to a particular setpoint 311 in menu 310, the sub-menu may allow the user to fill in a name and a setpoint with a virtual or physical keyboard. Some sub-menus, especially those affiliated with setpoints 311 may include delete or clear toggles. Additionally, sub-menus affiliated with setpoints 311 may enable a driver to choose a storage term for the setpoint. For example, the sub-menu may enable the driver to choose a permanent storage term, the user-adjustable number of days storage term, or a storage term limited to the user-adjustable number of key cycles.

The above-described embodiments, and particularly any "preferred" embodiments, are possible examples of implementations and merely set forth for a clear understanding of the principles of the invention. Many variations and modifications may be made to the above-described The following is claimed:

1. A cruise control system comprising:
   a vehicle having a steering system, an accelerator system, a braking system, a battery, a display, a processor, and memory; and
   a cruise control program, operatively coupled to the accelerator system, configured to display:
   a most recent cruising setpoint, and
   a menu of user-adjustable cruising setpoints, wherein the cruise control program updates the menu based on a received location.

2. The cruise control system of claim 1, wherein the cruise control program is configured to display the most recent cruising setpoint and the menu when the vehicle is in a park gear.

3. The cruise control system of claim 1, wherein the cruise control program is configured to compare a present speed of the vehicle with a user-applied setpoint.

4. The cruise control system of claim 3, wherein the cruise control program is configured to decline the user-applied setpoint when a difference between the present speed and the user-applied setpoint exceeds a predetermined value.

5. The cruise control system of claim 4, wherein the predetermined value is hard-coded into the cruise control program.

6. The cruise control system of claim 4, wherein the cruise control program is configured to display a visual cue when a user selection is declined.

7. The cruise control system of claim 1, wherein the cruise control program is configured to update the menu based on a received time.

8. The cruise control system of claim 1, wherein the cruise control program is configured to display a user-adjustable quantity of most recent cruising speeds.

9. The cruise control system of claim 8, wherein the cruise control program is configured to only display the most recent cruising speeds of a particular driver.

10. The cruise control system of claim 8, wherein the cruise control program is configured to only display the most recent cruising speeds for a current key cycle.

11. The cruise control system of claim 1, wherein the cruise control program is configured to associate each of the user-adjustable cruising setpoints with a user-adjustable storage term.

12. The cruise control system of claim 11, wherein the storage terms include an indefinite storage term and a key cycle storage term.

13. A method of setting a cruise control speed on a vehicle having a steering system, an accelerator system, a braking system, a battery, a display, a processor, and memory, comprising:
    displaying, on a cruise control program operatively coupled to the accelerator system:
    a most recent cruising setpoint, and
    a menu of user-adjustable cruising setpoints, wherein the cruise control program updates the menu based on a received location.

14. The method of claim 13, wherein displaying the most recent cruising setpoint and the menu occurs when the vehicle is in a park gear.

15. The method of claim 13, further comprising declining to implement a user-applied setpoint when a difference between a present speed and the user-applied setpoint exceeds a predetermined value.

16. The method of claim 15, further comprising displaying a visual cue when a user selection is declined.

17. The method of claim 15, further comprising displaying a user-adjustable quantity of most recent cruising speeds of a particular driver.

18. The method of claim 15, further comprising displaying a user-adjustable quantity of most recent cruising speeds for a current key cycle.

19. The method of claim 15, further comprising associating each of the user-adjustable cruising setpoints with a user-adjustable storage term.

20. The method of claim 19, wherein the storage terms include an indefinite storage term and a key cycle storage term.

* * * * *